United States Patent
Stephens et al.

(10) Patent No.: US 10,966,258 B2
(45) Date of Patent: Mar. 30, 2021

(54) METHODS AND SYSTEMS FOR MANAGING NETWORK HOTSPOTS

(71) Applicant: COMCAST CABLE COMMUNICATIONS, LLC, Philadelphia, PA (US)

(72) Inventors: Billy Stephens, West Chester, PA (US); Sanjay K. Sharma, Olathe, KS (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/453,413

(22) Filed: Mar. 8, 2017

(65) Prior Publication Data
US 2018/0263067 A1    Sep. 13, 2018

(51) Int. Cl.
| | | |
|---|---|---|
| H04W 76/11 | (2018.01) | |
| H04W 4/02 | (2018.01) | |
| H04W 12/08 | (2009.01) | |
| H04W 4/021 | (2018.01) | |
| H04W 12/00 | (2009.01) | |
| H04W 12/04 | (2009.01) | |
| H04W 84/12 | (2009.01) | |

(52) U.S. Cl.
CPC ............ *H04W 76/11* (2018.02); *H04W 4/021* (2013.01); *H04W 4/023* (2013.01); *H04W 12/0023* (2019.01); *H04W 12/00503* (2019.01); *H04W 12/00516* (2019.01); *H04W 12/04033* (2019.01); *H04W 12/08* (2013.01); *H04W 84/12* (2013.01)

(58) Field of Classification Search
None
See application file for complete search history.

(56) References Cited

U.S. PATENT DOCUMENTS 6,061,561 A * 5/2000 Alanara ............... G01S 19/17
455/456.1
6,885,859 B2   4/2005 Karaoguz et al.
(Continued)

FOREIGN PATENT DOCUMENTS

EP    3 026 953 A1 *   1/2016

OTHER PUBLICATIONS

Android Central—NPL_How to set up a Wi-Fi hotspot on an Android phone (Year: 2016).*
(Continued)

*Primary Examiner* — Andre Tacdiran
(74) *Attorney, Agent, or Firm* — Ballard Spahr LLP

(57) ABSTRACT

Disclosed are various systems and methods for monitoring and maintaining networks, such as networks associated with a wireless access point. In an aspect, a user device that was connected the wireless access point and loses connectivity to the access point can receive network parameters for implementing a new wireless network, where the network parameters are associated with the network as implemented by the wireless access point that is no longer available. The user device can activate a new wireless hotspot mode using the received network parameters. The resulting new wireless hotspot can implement various aspects of the wireless access point and associated network. The new wireless hotspot enabled by the user device can allow other devices, previously connected to the access point, to automatically connect to the new wireless hotspot.

22 Claims, 5 Drawing Sheets

(56) References Cited

U.S. PATENT DOCUMENTS

| | | |
|---|---|---|
| 7,382,771 B2 | 6/2008 | Leblanc et al. |
| 8,804,517 B2 | 8/2014 | Oerton |
| 9,549,329 B2 | 1/2017 | Mancuso et al. |
| 9,706,383 B2 | 7/2017 | Kiukkonen et al. |
| 2007/0167174 A1* | 7/2007 | Halcrow .............. H04W 48/16 455/456.2 |
| 2008/0175187 A1* | 7/2008 | Lowry ................. H04W 48/14 370/328 |
| 2010/0210280 A1* | 8/2010 | Haynes ................. G01S 5/0205 455/456.1 |
| 2012/0063327 A1* | 3/2012 | Sakai .................... H04W 8/005 370/242 |
| 2014/0112231 A1* | 4/2014 | Qin ................... H04W 52/0245 370/311 |
| 2014/0280985 A1* | 9/2014 | Maguire ................ H04W 4/80 709/227 |
| 2015/0139025 A1* | 5/2015 | Lee ...................... H04W 76/11 370/254 |
| 2016/0013856 A1* | 1/2016 | Kikuchi .............. H04W 64/003 370/315 |
| 2016/0127381 A1* | 5/2016 | Zhong .................. H04W 76/10 726/4 |
| 2016/0212774 A1* | 7/2016 | Tran Le ............ H04W 52/0206 |
| 2016/0219589 A1* | 7/2016 | Khawer ............ H04W 72/0453 |
| 2016/0295622 A1* | 10/2016 | Huang .................. H04W 12/06 |
| 2016/0353495 A1* | 12/2016 | Smadi .................. H04W 48/14 |
| 2017/0064745 A1* | 3/2017 | Kephart, Jr. ............ H04W 4/80 |
| 2017/0150531 A1* | 5/2017 | Horbatt .................. B60L 53/60 |
| 2017/0181047 A1* | 6/2017 | Cai ...................... H04W 36/03 |
| 2017/0310640 A1* | 10/2017 | Chechani ............ H04L 63/0272 |
| 2017/0332155 A1* | 11/2017 | Branch .................... H04Q 9/00 |
| 2018/0027433 A1* | 1/2018 | Elliott .................. H04W 24/04 370/216 |
| 2018/0083795 A1* | 3/2018 | Zehler .................. H04W 76/10 |
| 2018/0131988 A1* | 5/2018 | Kashyap ................ G06K 9/62 |
| 2018/0288686 A1* | 10/2018 | Sun ........................ H04W 4/40 |

OTHER PUBLICATIONS

Netgear—NPL_How to Change Security Settings on the AT&T Mobile Hotspot Elevate (Aircard 754S) (Year: 2016).*

* cited by examiner

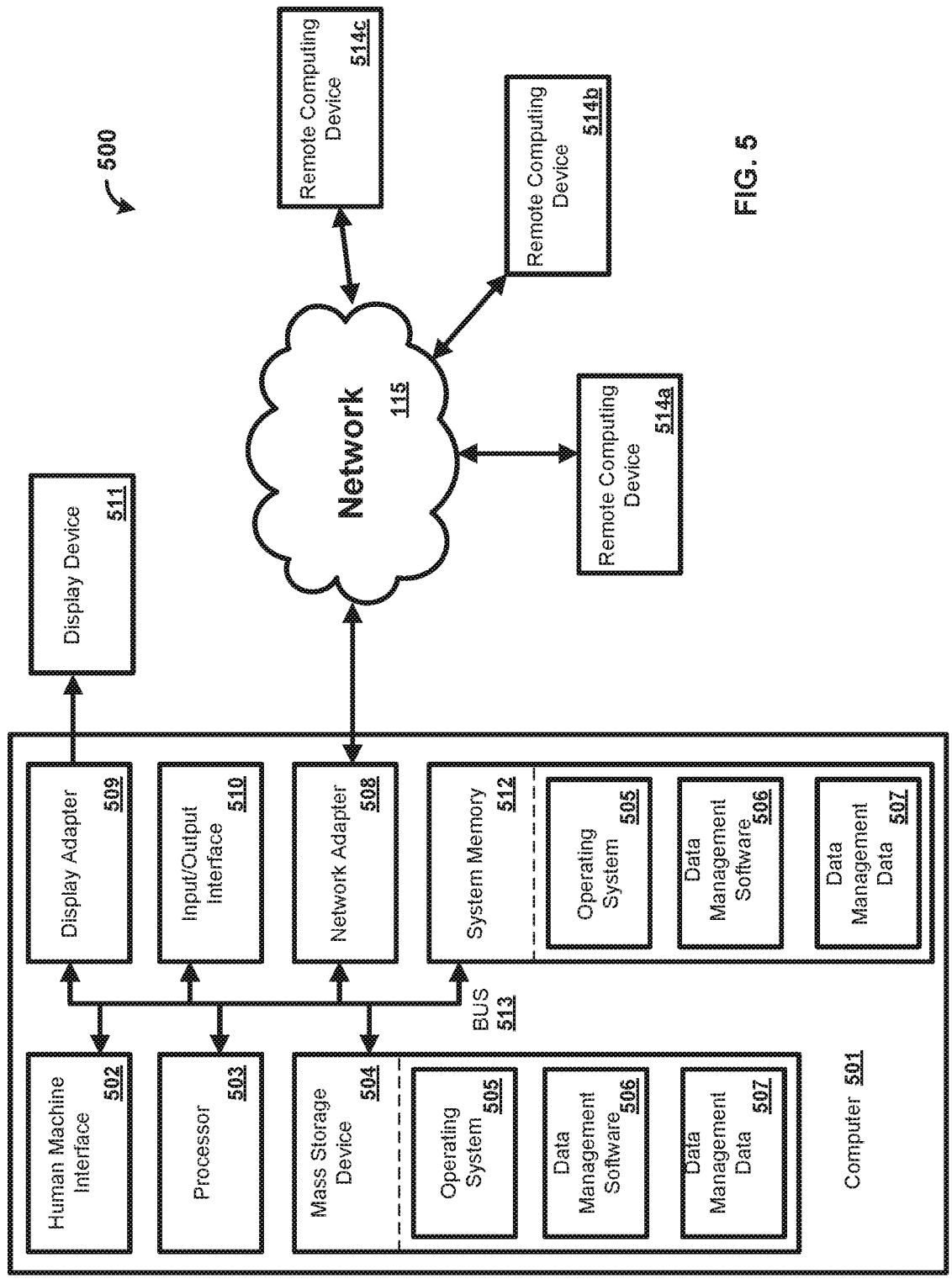

METHODS AND SYSTEMS FOR MANAGING NETWORK HOTSPOTS

BACKGROUND

Users commonly connect user devices to wireless networks to access the Internet or other network-enabled services. A user may have a wireless network to which their devices most frequently connect, typically a home wireless network. When away from the home wireless network, these user devices may have to connect to publically accessible wireless networks. This may require manual configuration of security or authentication parameters for each public network. This may also require the device to remember profiles for each network to which it is connected. Over time, storing of multiple profiles for various networks in user devices may result in unpredictable connectivity and reliability. These and other shortcomings are addressed by the methods and systems disclosed herein.

SUMMARY

It is to be understood that both the following general description and the following detailed description are exemplary and explanatory only and are not restrictive. Provided are methods and systems for managing network hotspots. In some aspects, a network device can connect to a server and transmit one or more network parameters of the network device to the server. These network parameters can include, for example, a service set identifier (SSID) or other network identifier. These network parameters can also include security or authentication parameters for connecting to a wireless network provided by the network device, such as a username, a password, a wireless encryption protocol, a wireless encryption key, or other parameters. The server can then transmit the network parameters to a user device, such as a mobile network router ("hotspot"), a smartphone, a tablet, a computer, or other device capable of creating a wireless network accessible to other devices, e.g., a device capable of a wireless hotspot mode. The user device can store the network parameters in one or more profiles.

In some aspects, the user device can determine when a distance of the user device to the network device meets or exceeds a threshold. For example, the user device may use a global positioning system (GPS) location of the user device and compare it to a location of the network device. When the distance to the network device meets or exceeds the threshold, the user device enables a wireless hotspot mode using the network parameters received from the server.

In other aspects, the user device can determine when a network associated with the network device is inaccessible to the user device. This can include determining if a beacon or other identifying signal associated with the network is not detected. This can also include determining whether a signal strength of a network connection to the network falls below a threshold. When the network is determined to be inaccessible, the user device enables the wireless hotspot mode using the network parameters received from the server.

In creating a wireless hotspot using the network parameters received from the server, the wireless hotspot effectively replicates the parameters of the wireless network of the network device. Thus, other user devices configured to access the wireless network of the network device can connect to the wireless hotspot of the user device using the already stored profiles. This allows the other user devices to connect automatically without the need to manually create profiles for a new network or to switch profiles for a new network, and reduces the number of profiles needed to be stored by the user devices.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a block diagram illustrating an example computing device.

DETAILED DESCRIPTION

Figure 1:
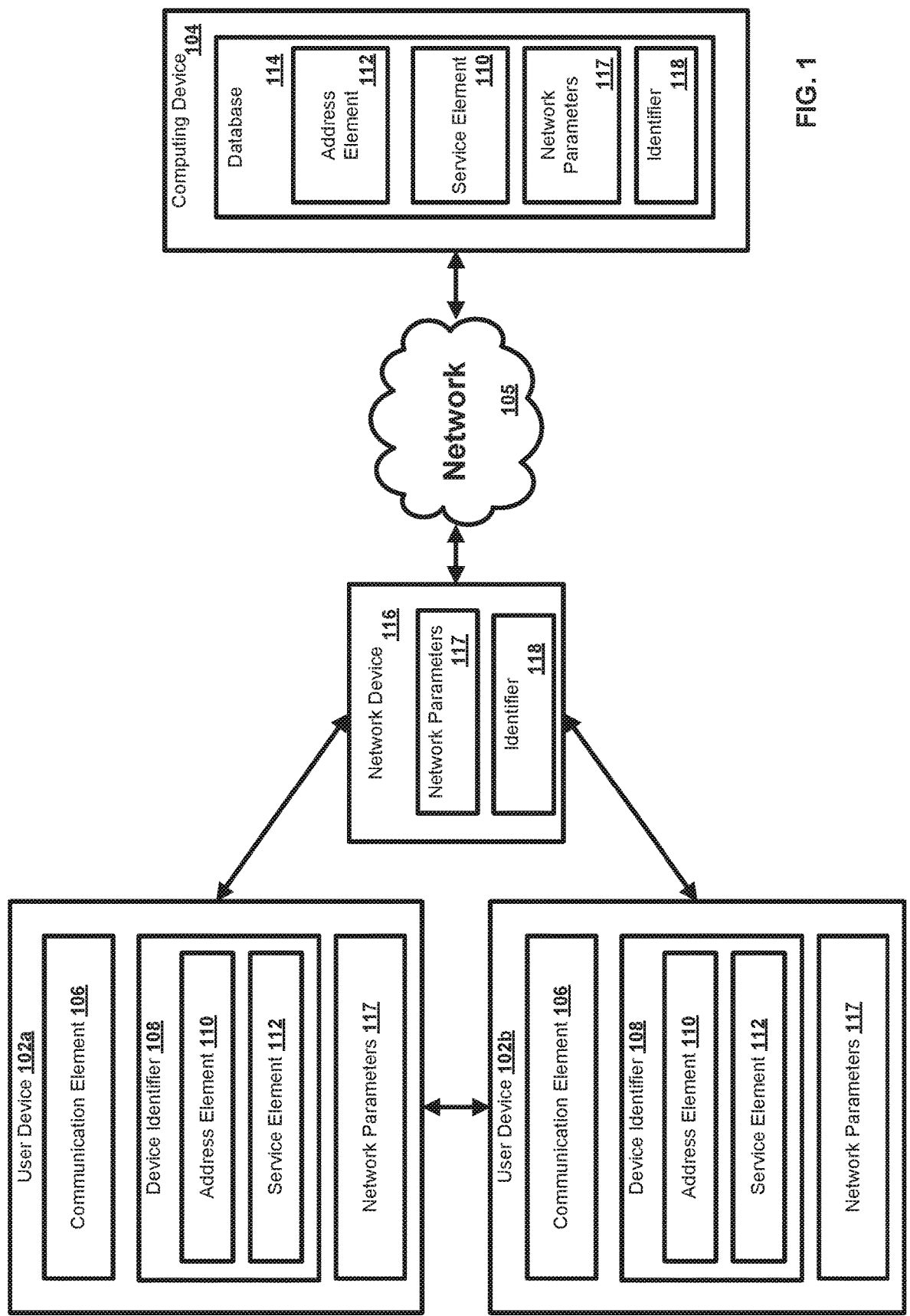
FIG. 1 is a block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to using a wireless hotspot feature of a user device to duplicate network parameters of another wireless network of a network device, such as a home network. For example, the user device may duplicate a network identifier of the wireless network of the network device, such as an SSID. The user device may also duplicate authentication information such as usernames, passwords, encryption protocols, or keys used to access the wireless network of the network device. To other user devices, the resulting network created by the user device would appear to be identical to the wireless network of the network device. Thus, other user devices configured to access the wireless network of the network device can automatically connect to the wireless hotspot created by the user device using already stored credentials or profiles. To ensure comparable functionality to the wireless network of the network device, the network parameters being duplicated may include firewall or other network traffic configurations. User devices connected to the wireless hotspot created by the user device may then connect to the Internet or other networks using another network connection available to the user device implementing the wireless hotspot, such as a cellular network connection or another wireless network connection.

In an aspect, the user device can receive the network parameters of the network device from a remote computing device (e.g., a server). The network device may transmit the network parameters associated with a wireless network implemented by the network device to the server. The server may then transmit these network parameters to the user device. This can include an application or application program interface implemented on the user device connecting to the server to receive the network parameters.

In another aspect, the user device can receive the network parameters of the network device through user input. For example, the user device may receive input indicating the SSID, wireless encryption protocol, encryption key, or other credentials associated with the wireless network. This input may correspond to a profile facilitating a past or subsequent connection to the wireless network of the network device by the user device. The user device may then access this stored profile when creating a wireless hotspot in order to duplicate the network parameters of the network device.

In some aspects, to determine when to activate the wireless hotspot, the user device may determine when the user device is a distance from the network device meeting or exceeding a threshold. This can include using geolocation features of the user device, such as a Global Positioning System (GPS), to identify a location of the user device. The location of the user device can be compared to a predefined location associated with the network device, such as an address. The location of the user device can also be compared to a dynamically determined location of the network device using geolocation, network triangulation, or another approach. When the distance of the user device from the network device meets or exceeds the threshold, the user device activates the wireless hotspot using the network parameters of the network device.

In other aspects, to determine when to activate the wireless hotspot, the user device may determine when an accessibility of the network device meets a predefined condition. For example, if the user device is connected to the wireless network of the network device, the user device may determine that the network device is inaccessible when the user device disconnects from the wireless network, or when a signal strength of a wireless connection to the network device falls below a threshold. As another example, if the user device cannot detect a beacon or other signal identifying the wireless network of the network device, the user device may determine that the network device is inaccessible. This allows the user device to determine the accessibility of the network device without maintaining a wireless connection to the network device. When the accessibility of the network device by the user device meets a predefined condition, the user device can activate the wireless hotspot using the network parameters of the network device.

The resulting network created by the wireless hotspot of the user device replicates the network identifier and any corresponding authentication or encryption used to access the wireless network of the network device. Thus, other user devices having stored profiles for accessing the wireless network of the network device can automatically connect to the wireless hotspot. These user devices may then use a cellular data connection or other wireless connection of the user device implementing the wireless hotspot in order to access the Internet or other networks.

In one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a mobile network router, a computer, a tablet, a mobile device, a communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise user devices 102*a* and 102*b*, hereinafter referred to collectively as 102*a/b*, in communication with a computing device 104 such as a server, for example. The computing device 104 can be disposed locally or remotely relative to the user device 102*a/b*. As an example, the user device 102*a/b* and the computing device 104 can be in communication via a private and/or public network 105 such as the Internet or a local area network. Other forms of communications can be used such as wired and wireless telecommunication channels, for example.

In an aspect, the user device 102*a/b* can be an electronic device such as a mobile network router, a computer, a smartphone, a laptop, a tablet, a set top box, a display device, or other device capable of communicating with the computing device 104. As an example, the user device 102*a/b* can comprise a communication element 106 for providing an interface to a user to interact with the user device 102*a/b* and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102*a/b* and the computing device 104. As an example, the communication element 106 can request or query various files from a local source and/or a remote source. As a further example, the communication element 106 can transmit data to a local or remote device such as the computing device 104.

In an aspect, the user device 102*a/b* can be associated with a user identifier or device identifier 108. As an example, the device identifier 108 can be any identifier, token, character, string, or the like, for differentiating one user or user device (e.g., user device 102*a/b*) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102*a/b*, a state of the user device 102*a/b*, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102*a/b* and the computing device 104 or other devices and/or networks. As a further example, the address element 110 can be used as an identifier or locator of the user device 102*a/b*. In an aspect, the address element 110 can be persistent for a particular network.

In an aspect, the service element 112 can comprise an identification of a service provider associated with the user device 102*a/b* and/or with the class of user device 102*a/b*. The class of the user device 102*a/b* can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102*a/b*. As a further example, the service element 112 can comprise information relating to a preferred service provider for one or more particular services relating to the user device 102*a/b*. In an aspect, the address element 110 can be used to identify or retrieve data from the service element 112, or vice versa. As a further example, one or more of the address element 110 and the service element 112 can be stored remotely from the user device 102*a/b* and retrieved by one or more devices such as the user device 102*a/b* and the computing device 104. Other information can be represented by the service element 112.

In an aspect, the user device 102*a/b* can store network parameters 117. The network parameters 117 can comprise information such as SSIDs, passwords, security settings, combinations thereof, and the like for one or more networks and/or network devices to which the user device 102*a/b* is authorized to connect. For example, the network parameters 117 can comprise network credentials for accessing a network device 116. The network parameters 117 can further include wireless encryption protocols (e.g. Wired Equivalent Privacy (WEP), Wi-Fi Protected Access (WPA), Wi-Fi Protected Access II (WPA2)) and corresponding keys to restrict access and secure communications of the network. The network parameters 117 can also include firewall configurations, traffic routing configurations, and other network traffic configurations. In an aspect, some or all of the network parameters 117 can be stored in an encrypted or hashed form.

The user device 102*a/b* can be configured as a wireless access point (WAP). In such an aspect, the user device 102*a/b* can be configured to allow one or more wireless devices, such as another user device 102*a/b*, to connect to a wireless network using Wi-Fi, Bluetooth or similar standard. The user device 102*a/b* can then facilitate a connection of the wireless device to a network 105 via cellular, satellite, or other connection of the user device 102*a/b* to the network 105.

In an aspect, the network device 116 can be in communication with a network, such as a network 105. As an example, the network device 116 can facilitate the connection of a device, such as the user device 102*a/b* and/or other user devices, to the network 105. As a further example, the network device 116 can be configured as a network gateway and/or an access point. As a further example, the network device 116 can be configured as a wireless access point (WAP). In an aspect, the network device 116 can be configured to allow one or more wireless devices to connect to a wired and/or wireless network using Wi-Fi, Bluetooth or similar standard.

In an aspect, the network device 116 can be configured as a mesh network. As an example, the network device 116 can comprise a multi-band wireless network device. As an example, the network device 116 can be configured with a first service set identifier (SSID) to function as a local network for a particular user or users (e.g., associated with a user network or private network). As a further example, the network device 116 can be configured with a second service set identifier (SSID) (e.g., associated with a public/community network, hidden network, or limited services (e.g., provisioning) network) to function as a secondary network or redundant network for connected communication devices. The network device 116 can be accessed through the use of the network parameters 117. The network parameters 117 can be stored on the network device 116 and can comprise information such as SSIDs, passwords, security settings, combinations thereof, and the like for one or more networks and/or network devices to which the user device 102*a/b* is authorized to connect. For example, the network parameters 117 can comprise network credentials for accessing a network device 116. The network parameters 117 can further include wireless encryption protocols (e.g. Wired Equivalent Privacy (WEP), Wi-Fi Protected Access (WPA), Wi-Fi Protected Access II (WPA2)) and corresponding keys to restrict access and secure communications of the network. The network parameters 117 can also include firewall configurations, traffic routing configurations, and other network traffic configurations. In an aspect, some or all of the network parameters 117 can be stored in an encrypted or hashed form.

In an aspect, the network device 116 can comprise an identifier 118. As an example, the identifier 118 can be a media access control address (MAC address). As a further example, the identifier 118 can be a unique identifier for facilitating communications on the physical network segment. In an aspect, each of the network device 116 can comprise a distinct identifier 118. As an example, the identifiers 118 can be associated with a physical location of the network device 116.

The network device 116 can be in communication with the computing device 104 to provide the computing device 104 with up-to-date network parameters 117. The network device 116 can be configured to transmit the network parameters 117 to the computing device 104 upon detecting a change in the network parameters 117 or the network device 116 can transmit the network parameters 117 to the computing device 104 periodically (e.g., every hour, every day, etc. . . . ). In an aspect, the network device 116 can transmit the identifier 118 with the network parameters 117 to aid in proper updating of data stored in the database 114. In an aspect, the computing device 104 can be a server for communicating with the user device 102*a/b* through the network 105 via the network device 116. As an example, the computing device 104 can communicate with the user device 102*a/b* for providing services.

In an aspect, the computing device 104 can be a server for communicating with the user device 102*a/b*. As an example, the computing device 104 can communicate with the user device 102*a/b* for providing data and/or services. As an example, the computing device 104 can provide services such as network (e.g., Internet) connectivity, network printing, media management (e.g., media server), content services, streaming services, broadband services, or other network-related services.

In an aspect, the computing device 104 can allow the user device 102*a/b* to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102*a/b* and a database 114 for sending and receiving data there between. As an example, the database 114 can store a plurality of files (e.g., web pages), user identifiers or records, or other information. As a further example, the user device 102*a/b* can request and/or retrieve a file from the database 114. In an aspect, the database 114 can store information relating to the user device 102*a/b* (such as the address element 110, and/or the service element 112), information related to a user of the user device 102*a/b* (such as user account information), network parameters 117 related to one or more networks/network devices that the user/user device 102*a/b* can access (e.g., the network device 116). The network parameters 117 can comprise information such as SSIDs, passwords, security settings, combinations thereof, and the like for one or more networks and/or network devices to which the user device 102*a/b* is authorized to connect. For example, the network parameters 117 can comprise network credentials for accessing a network device 116. The network parameters 117 can further include wireless encryption protocols (e.g. Wired Equivalent Privacy (WEP), Wi-Fi Protected Access (WPA), Wi-Fi Protected Access II (WPA2)) and corresponding keys to restrict access and secure communications of the network. The network parameters 117 can also include firewall configurations, traffic routing configurations, and other network traffic configurations. In an aspect, some or all of the network parameters 117 can be stored in an encrypted or hashed form.

As an example, the computing device 104 can obtain the device identifier 108 from the user device 102*a/b* and retrieve information from the database 114 such as the address element 110 and/or the service elements 112. As a further example, the computing device 104 can obtain the address element 110 from the user device 102*a/b* and can retrieve the service element 112 from the database 114, or vice versa. As another example, the computing device 104 can obtain the device identifier 108 from the user device 102a/b and can retrieve user account information and/or network credentials associated with the network device 116. Any information can be stored in and retrieved from the database 114. The database 114 can be disposed remotely from the computing device 104 and accessed via direct or indirect connection. The database 114 can be integrated with the computing system 104 or some other device or system. The computing device 104 can receive the network parameters 117 from the network device 116. The computing device 104 can determine what user account information is associated with the network device 116 and update the network parameters 117 stored in the database 114 accordingly.

A user device 102a can determine whether a condition has been satisfied for initiating a wireless hotspot mode. In an aspect, this can include determining when a distance between the user device 102a and the network device 116 meets or exceeds a threshold. In another aspect, this can include determining when a signal strength of a connection between the user device 102a and network device 116 falls below a threshold. In another aspect, this can include determining when the user device 102a disconnects from the network device 116. In a further aspect, this can include determining when a beacon or other identifying signal from the network device 116 is not detected. When such a condition is satisfied, the user device 102a activates a wireless hotspot mode configured according to the network parameters 117 of the network device 116 received from the computing device 104.

The wireless hotspot mode of the user device 102a can be activated by an application or service executed in the user device 102a accessing application program interfaces (APIs) for configuring the wireless hotspot mode. The application can use the network parameters 117 as parameters for the API calls to activate the wireless hotspot mode, thereby creating a wireless network duplicating the network parameters 117 of the network device 116. The communication element 106 of the user device 102a may facilitate the operation of the wireless hotspot by accepting connections from other user devices 102b. For example, for a given first user device 102a implementing a wireless hotspot, a second user device 102b may connect to the communication element 106 of the first user device 102a using saved network parameters 117 for connecting to the network device 116. The second user device 102b can then access the network 105 through one or more other communication elements 106 of the first user device 102a, including a cellular communication element 106, satellite communication element 106, or radio communication element, or another communication element 106. Thus, connectivity to the network 105 by the user device 102b can resume without requiring the user device 102b to be reconfigured for a new connection.

In an aspect, the network parameters 117 of the network device 116 may change after being transmitted to the user device 102a. The user device 102a can update the stored network parameters 117 corresponding to the network device 116 to reflect these changes. For example, in an aspect, the network device 116 can transmit updated network parameters 117 to the computing device 104. This can be performed in response to an update to the network parameters 117. This can also be performed at a predefined time after an update to the network parameters 117. The computing device 104 can also be configured to poll or query the network device 116 for changes in the network parameters 117. The network device 116 can then transmit the updated network parameters 117 to the computing device 104 in response to the polling.

The user device 102a can then receive the updated network parameters 116 from the computing device 104. In an aspect, the user device 102a may poll the computing device 104 for updated network parameters 116. The polling by the user device 102a may be performed at a predefined interval or in response to a user input indicating that a polling should occur. The computing device 102a can then transmit the updated network parameters 116 to the user device 102. In another aspect, the computing device 104 can push or otherwise transmit the updated network parameters 116 to the user device 102a without being polled or queried.

The user device 102a will then operate its wireless hotspot mode to reflect the updated network parameters 116. In an aspect, the user device 102a may receive updated network parameters 116 while operating in a wireless hotspot mode reflecting the previous network parameters 116. In such an aspect, the user device 102a may delay updating the network parameters 116 of the wireless hotspot mode until the wireless hotspot mode is deactivated, until the user device 102a is within a predefined distance of the network device 116, or until the network device 116 is accessible as described. This allows other user devices 102b connected to the wireless hotspot to remain connected, as changing the network parameters 116 of the wireless hotpot while user devices 102b are connected may force a disconnection of these user devices 102b.

In a further aspect, the user device 102a may render a notification on receipt of updated network parameters 116. The notification may solicit a user selection as to whether to modify the network parameters 116 of the wireless hotspot mode to reflect the updated network parameters 116, or delay the modification until indicated by a subsequent user selection, or in response to another condition being satisfied.

Figure 2:
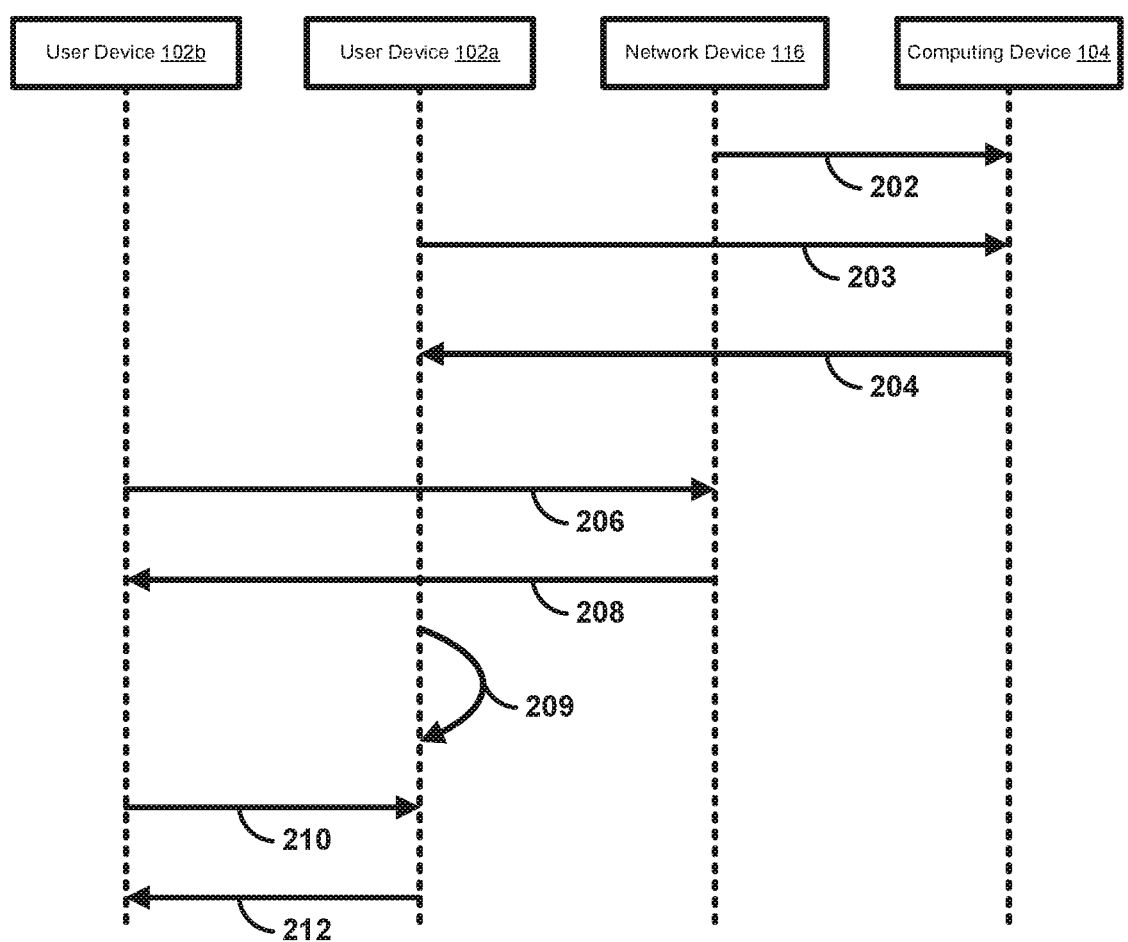
FIG. 2 is an example communications flow in the exemplary system.

FIG. 2 shows an example communications flow according to the system presented in FIG. 1. In step 202, a network device 116 shares (e.g., transmits, via a pre-scheduled transmission or in response to a request) with a computing device 104 one or more network parameters 117 for a wireless network managed, implemented or otherwise provided by the network device 116. In step 203, a user device 102a sends a request to the computing device 104 for the network parameters 117. In an aspect, the user device 102a can send the request to the computing device 104 for the network parameters 117 in response to a loss of connection to the network device 116, in response to a signal strength or signal power level dropping below a threshold, or in response to another condition. In another aspect, the user device 102a can send the request to the computing device 104 for the network parameters 117 at a predefined interval, on connection to the network device 116, or in response to another condition such that the network parameters 117 are stored by the user device 102a before a loss of connection or signal strength. The computing device 104 transmits the network parameters 117 to the user device 102a in step 204.

A user device 102b connected to the network device 116 sends requests in step 206 and receives responses in step 208. Steps 206 and 208 are representative of general communications by a user device 102b accessing a network through the network device 116. At step 209, the user device 102a activates a wireless hotspot mode, thereby creating a wireless hotspot using the network parameters 117 received from the computing device 104. In an aspect, the user device 102a can activate the wireless hotspot mode in response to being outside of a range of a network device 116 as described above. For example, the user device 102a can activate the wireless hotspot mode in response to a disconnection from the network device 116. As another example, the user device 102a can activate the wireless hotspot mode in response to a failed attempt to connect to the network device 116. As another example, the user device 102a can activate the wireless hotspot mode in response to a signal strength or other connection attribute associated with the network device falling below a threshold. In another example, the user device 102a can activate the wireless hotspot mode in response to a distance from the network device 116 or a location associated with the network device 116 (e.g., an address associated with the network device 116 or an account to which the network device 116 was assigned) exceeding a threshold. In step 210, the user device 102b has now connected to the wireless hotspot of the user device 102a. Accordingly, at step 210, the user device 102b transmits requests to the user device 102a, and receives responses from the user device 102a in step 212. This is representative of the user device 102b now performing general communications through the wireless hotspot of the user device 102a instead of the network device 116.

Figure 3:
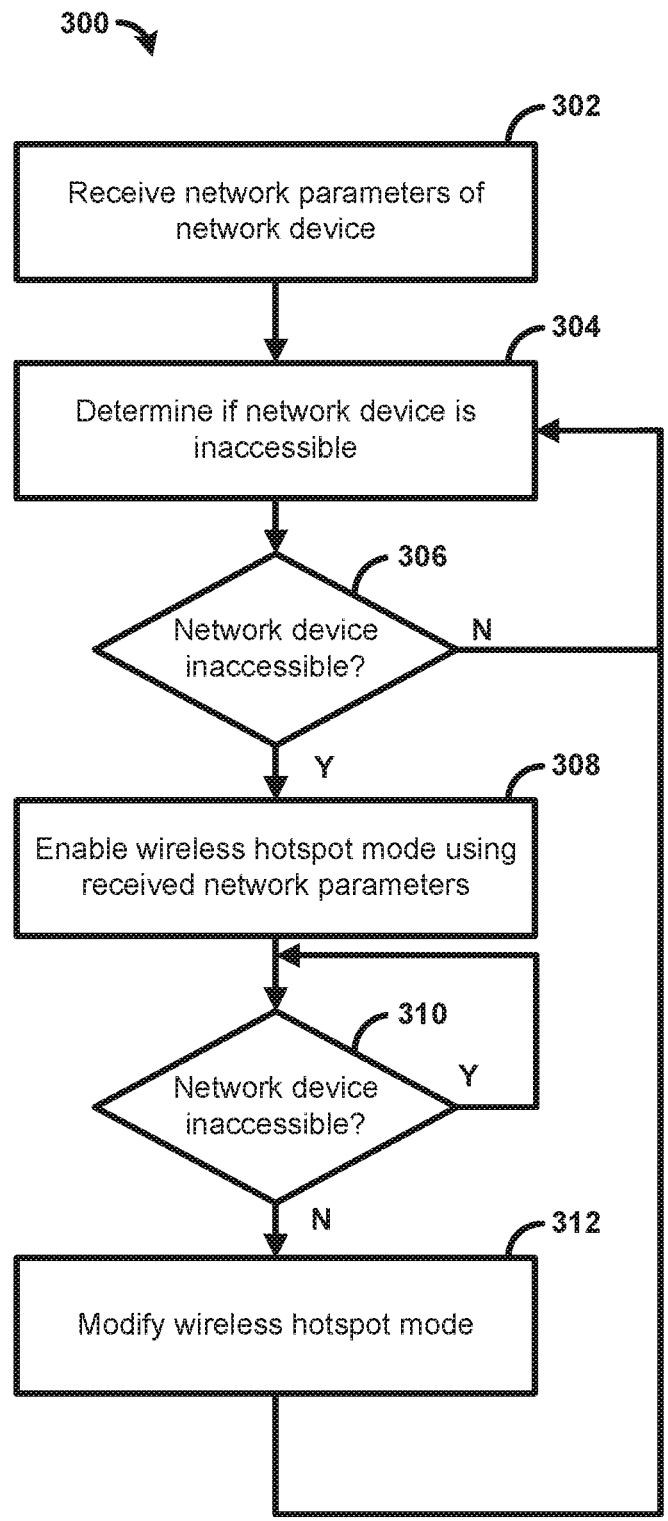
FIG. 3 is a flowchart illustrating an example method.

FIG. 3 shows an example method 300. In step 302, a user device, such as user device 102a, receives network parameters 117 of a network device 116. The user device 102a can be an electronic device such as a mobile network router, a computer, a smartphone, a laptop, a tablet, a set top box, a display device, or other device capable of communicating with the network device 116. The network device 116 can be a Wireless Access Point (WAP), a gateway, a router, or other device capable of connecting a user device 102a/b to a network 105. In one embodiment, the network device 116 is a WAP in a user's home network. The network parameters 117 can comprise network credentials for accessing a network device 116. The network parameters 117 can further include wireless encryption protocols (e.g. Wired Equivalent Privacy (WEP), Wi-Fi Protected Access (WPA), Wi-Fi Protected Access II (WPA2)) and corresponding keys to restrict access and secure communications of the network. The network parameters 117 can also include firewall configurations, traffic routing configurations, and other network traffic configurations. In an aspect, some or all of the network parameters 117 can be stored in an encrypted or hashed form. The network parameters 117 can comprise system level parameters, and device specific parameters (e.g., device pairing, device service type and quality of service parameters). In an aspect, the network parameters 117 can be received by the user device 102a from a computing device 104 such as a server in communication with the network device 116. In another aspect, the network parameters 117 may be received by a user input. For example, the user device 102a may be configured by user input to access a wireless network provided by the network device 116. The network parameters 117 may be stored in a profile in the user device 102a to facilitate automatic access to the network device 116.

Next, in step 304, a monitoring or connected device, such as the user device 102a, can determine if the network device 116 is inaccessible. In an aspect, this determination can be performed at a predefined interval. In another aspect, this determination can be performed in response to a user input indicating that the user device 102a should perform the determination. In an aspect, determining if the network device 116 is inaccessible can include determining if a beacon or other signal identifying the network device 116 is not detected. As an example, include determining if a beacon or other signal identifying the network device 116 is not detected can include determining if a beacon including an SSID matching the network parameters 117 of the network device 116 is not detected. Thus, the user device 102a need not be connected to the network device 116 to determine if it is accessible. As another example, if the user device 102a is connected to a wireless network of the network device 116, this can include determining if the user device 102a becomes disconnected or if a signal strength or power of a connection to the network device 116 or a signal from the network device 116 falls below a threshold. As another example, determining if the network device 116 is inaccessible can include determining that a failed attempt to connect to the network device 116 by the user device 102a has occurred.

In step 306, if the network device 116 is accessible, the method can return to step 304, where the user device 102a can continue to monitor or determine if the network device 116 is inaccessible. If, in step 306, the network device 116 is determined to be inaccessible, the method can advance to step 308 where the user device 102a can enable a wireless hotspot mode using the network parameters 117 received from the computing device 104. Thus, the wireless hotspot duplicates the network parameters 117 of the network device 116. For example, the user device 102a can establish a wireless network having an SSID matching an SSID indicated in the network parameters 117 of the network device 116. As another example, the user device 102a can establish a wireless network having security or encryption protocols and/or credentials indicated in the network parameters 117 of the network device 116.

In an aspect, enabling a wireless hotspot mode using the network parameters 117 received from the computing device 104 can include activating a previously inactive or deactivated wireless hotspot mode of the user device 102a. In another aspect, enabling a wireless hotspot mode using the network parameters 117 received from the computing device 104 can include deactivating an existing wireless hotspot mode and reactivating the wireless hotspot mode using the received network parameters 117. In an aspect, the user device 102a may render a notification or other message indicating the activation or modification of the wireless hotspot mode.

In an aspect, enabling a wireless hotspot mode using the network parameters 117 received from the computing device 104 can include broadcasting a signal or beacon identifying the wireless network associated with the wireless hotspot mode. In another aspect, enabling a wireless hotspot mode using the network parameters 117 received from the computing device 104 can include refraining from broadcasting a signal or beacon identifying the wireless network if the wireless network is "hidden." As other user devices 102b may attempt to automatically reconnect to the wireless network of the network device 116, now unavailable, these user devices 102b can then automatically connect to the wireless network of the wireless hotspot mode of the user device 102b. Additionally, user devices 102b connecting to the wireless network of the wireless hotspot mode of the user device 102 can later connect to the wireless network of the network device 116 using the same network parameters 117.

In step 310 the user device 102a can continue to determine if the network device 116 is unavailable. In an aspect, this determination can be performed at a predefined interval. In another aspect, this determination can be performed in response to a user input indicating that the user device 102a should perform the determination. Step 310 can continue to be performed while the network device 116 is inaccessible. Once the network device 116 is no longer inaccessible, the method can advance to step 312 where the user device 102a can modify the wireless hotspot mode. In an aspect, this can include deactivating the wireless hotspot mode. In another aspect, this can include disconnecting one or more other user devices 102b connected to the wireless hotspot. In a further aspect, this can include changing one or more network parameters 117 of the wireless hotspot to be distinct from the network parameters 117 of the network device 116. Thus, the user device 102a can continue to provide a wireless hotspot, but without duplicating the network parameters 117 of the network device 116 so long as the network device 116 is accessible.

After modifying the wireless hotspot mode of the user device 102a in step 312, the method can return to step 304, where the user device 102a continues to determine if the network device 116 is inaccessible.

Figure 4:
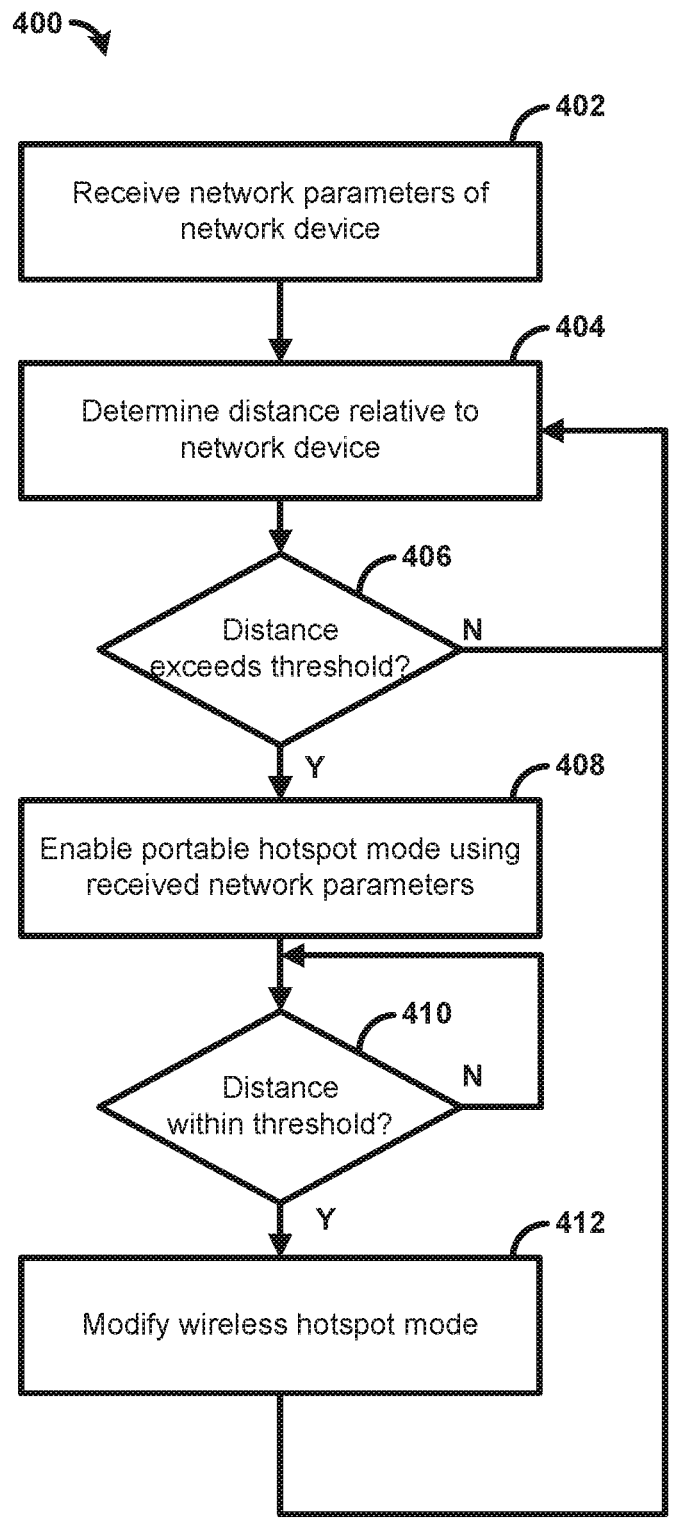
FIG. 4 is a flowchart illustrating an example method.

FIG. 4 shows an example method 400. In step 402, a user device 102a receives network parameters 117 of a network device 116. The user device 102a can be an electronic device such as a mobile network router, a computer, a smartphone, a laptop, a tablet, a set top box, a display device, or other device capable of communicating with the network device 116. The network device 116 can be a Wireless Access Point (WAP), a gateway, a router, or other device capable of connecting the user device 102a to a network 105. The network parameters 117 can comprise network credentials for accessing a network device 116. The network parameters 117 can further include wireless encryption protocols (e.g. Wired Equivalent Privacy (WEP), Wi-Fi Protected Access (WPA), Wi-Fi Protected Access II (WPA2)) and corresponding keys to restrict access and secure communications of the network. The network parameters 117 can also include firewall configurations, traffic routing configurations, and other network traffic configurations. In an aspect, some or all of the network parameters 117 can be stored in an encrypted or hashed form. In an aspect, the network parameters 117 can be received by the user device 102a from a computing device 104 such as a server in communication with the network device 116. In another aspect, the network parameters 117 can be received by a user input. For example, the user device 102a can be configured by user input to access a wireless network provided by the network device 116. The network parameters 117 can be stored in a profile in the user device 102a to facilitate automatic access to the network device 116.

Next, in step 404, the user device 102a can determine the distance of the user device 102a from the network device 116. In an aspect, this determination can be performed at a predefined interval. In another aspect, this determination can be performed in response to a user input indicating that the user device 102a should perform the determination. In an aspect, this may include determining a location of the user device 102a. The location of the user device 102a can be determined by a Global Positioning System (GPS) component of the user device 102a. The location of the user device 102a can also be determined by network triangulation. For example, if the user device 102a includes a cellular communication element 106, the location of the user device 102a can be determined using cellular tower triangulation.

Determining the distance of the user device 102a from the network device 116 can include determining a location of the network device 116. In an aspect, this can include receiving predefined location information corresponding to the network device 116. For example, the network device 116 can correspond to a known deployment address or customer address (e.g., associated with a particular user or local network). This address may be stored in the database 114 of the computing device 104. The user device 102a can then request the address information from the computing device 104 in order to determine the location of the network device 116.

In another aspect, the location of the network device 116 can be dynamically determined. For example, the location of the network device 116 can be determined based on wireless network triangulation or cellular network triangulation. As another example, if the network device 116 includes GPS components, the location of the network device 116 can be determined by a GPS location. As a further example, the location of the network device 116 may be determined according to an internet protocol address assigned to the network device 116.

In an aspect, the user device 116 can determine the location of the network device 116. In another aspect, the network device 116 can determine its location and transmit the location to the user device 116, or transmit the location to the computing device 104 for subsequent transmission to the user device 102a. In a further aspect, the computing device 104 can determine the location of the network device 116 and transmit the location of the network device 116 to the user device 102a.

In step 406, the user device 102a can determine if the distance of the user device 102a from the network device 116 exceeds a threshold. If not, the process can return to step 404. Otherwise, if the distance exceeds a threshold, the method can advance to step 408 where the user device 102a can enable a wireless hotspot mode using the network parameters 117 received from the computing device 104. Thus, the wireless hotspot can duplicate the network parameters 117 of the network device 116.

For example, the user device 102a can establish a wireless network having an SSID matching an SSID indicated in the network parameters 117 of the network device 116. As another example, the user device 102a can establish a wireless network having security or encryption protocols and/or credentials indicated in the network parameters 117 of the network device 116.

In an aspect, enabling a wireless hotspot mode using the network parameters 117 received from the computing device 104 can include activating a previously inactive or deactivated wireless hotspot mode of the user device 102a. In another aspect, enabling a wireless hotspot mode using the network parameters 117 received from the computing device 104 can include deactivating an existing wireless hotspot mode and reactivating the wireless hotspot mode using the received network parameters 117. In an aspect, the user device 102a can render a notification or other message indicating the activation or modification of the wireless hotspot mode.

In an aspect, enabling a wireless hotspot mode using the network parameters 117 received from the computing device 104 can include broadcasting a signal or beacon identifying the wireless network associated with the wireless hotspot mode. In another aspect, enabling a wireless hotspot mode using the network parameters 117 received from the computing device 104 can include refraining from broadcasting a signal or beacon identifying the wireless network if the wireless network is "hidden." As other user devices 102b may attempt to automatically reconnect to the wireless network of the network device 116, now unavailable, these user devices 102b can then automatically connect to the wireless network of the wireless hotspot mode of the user device 102b. Additionally, user devices 102b connecting to the wireless network of the wireless hotspot mode of the user device 102 can later connect to the wireless network of the network device 116 using the same network parameters 117.

In step 410 the user device 102a can determine if the distance between the user device 102a and the network device 116 is within a threshold. This threshold may be identical or distinct from the threshold used in step 406. In an aspect, this determination can be performed at a pre-defined interval. In another aspect, this determination can be performed in response to a user input indicating that the user device 102a should perform the determination. Once the user device 102a is a distance from the network device 116 within the threshold, the method can advance to step 412 where the user device 102a can modify its wireless hotspot mode. In an aspect, this can include deactivating the wireless hotspot mode. In another aspect, this can include disconnecting one or more other user devices 102b connected to the wireless hotspot. In a further aspect, this can include changing one or more network parameters 117 of the wireless hotspot to be distinct from the network parameters 117 of the network device 116. Thus, the user device 102a can continue to provide a wireless hotspot to other user devices 102b but without duplicating the network parameters 117 of the network device 116, i.e., a wireless network distinct from that provided by the network device 116, so long as the user device 102a is a distance relative to the network device 116 within the threshold.

After modifying the wireless hotspot mode of the user device 102a in step 412, the method can return to step 404, where the user device 102a can continue to determine if the distance between the user device 102a and network device 116 and determine if that distance exceeds a threshold.

In an exemplary aspect, the methods and systems can be implemented on a computer 501 as illustrated in FIG. 5 and described below. By way of example, user devices 102a/b or computing device 104 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 213, and all buses specified in this description can also be implemented over a wired or wireless network connection and each of the subsystems, including the one or more processors 503, a mass storage device 504, an operating system 505, data management software 506, data management data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the data management data 507 and/or program modules such as the operating system 505 and the data management software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the data management software 506. Each of the operating system 505 and the data management software 506 (or some combination thereof) can comprise elements of the programming and the data management software 506. The data management data 507 can also be stored on the mass storage device 504. The data management data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the data management software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method, comprising:
   receiving, by a user device, one or more network parameters of a wireless network associated with a network device, wherein the one or more network parameters of the wireless network comprise an identifier of the wireless network;
   determining, by the user device, that a geographic distance between the user device and the network device satisfies a threshold;
   enabling, by the user device, based on determining that the geographic distance between the user device and the network device satisfies the threshold, a wireless hotspot mode of the user device, wherein the wireless hotspot mode implements, as one or more network parameters of the wireless hotspot mode, the one or more network parameters of the wireless network; and
establishing, by the user device, based on the identifier of the wireless network, a network connection with another user device previously connected to the network device.

2. The method of claim 1, wherein the wireless hotspot mode implements the one or more network parameters of the wireless network further comprises implementing as one or more network credentials of the user device a network password for accessing the wireless network.

3. The method of claim 1, wherein receiving the one or more network parameters of the wireless network comprises receiving the one or more network parameters of the wireless network from a server.

4. The method of claim 3, further comprises sending, to the server, by the network device, the one or more network parameters of the wireless network.

5. The method of claim 1, wherein the user device comprises a mobile device.

6. The method of claim 1, wherein the one or more network parameters of the wireless network further comprise one or more of a wireless encryption protocol associated with the network device, a security credential, a firewall configuration, a traffic routing configuration, or a network traffic configuration of the wireless network.

7. The method of claim 1, wherein determining that the geographic distance between the user device and the network device satisfies the threshold comprises:
determining a geographic location of the user device; and
comparing the geographic location of the user device to a geographic location associated with the network device.

8. The method of claim 1, further comprising:
determining, by the user device, that the geographic distance between the user device and the network device no longer satisfies the threshold; and
modifying, by the user device based on determining that the geographic distance between the user device and the network device no longer satisfies the threshold, at least a portion of the one or more network parameters of the wireless hotspot mode to be different from the one or more network parameters of the wireless network.

9. A method, comprising:
receiving, by a user device, one or more network parameters of a wireless network associated with an access point, wherein the one or more network parameters of the wireless network comprise an identifier of the wireless network;
determining, by the user device, that an accessibility between the access point and the user device satisfies a condition;
enabling, by the user device, based on determining that the accessibility between the access point satisfies the condition, a wireless hotspot mode of the user device, wherein the wireless hotspot mode implements, as one or more network parameters of the wireless hotspot mode, the one or more network parameters of the wireless network;
establishing, by the user device, based on the identifier of the wireless network, a network connection with another user device previously connected to the access point based on the identifier of the wireless network;

determining, by the user device, that the accessibility between the access point by the user device no longer satisfies the condition; and
modifying, based on determining that the accessibility between the access point no longer satisfies the condition, at least a portion of the one or more network parameters of the wireless hotspot mode to be different from the one or more network parameters of the wireless network while remaining in the wireless hot spot mode.

10. The method of claim 9, wherein determining that the accessibility between the access point and the user device satisfies the condition comprises determining that the user device cannot detect a signal associated with the access point.

11. The method of claim 9, wherein determining that the accessibility between the access point and the user device satisfies the condition comprises determining that a signal strength between the user device and the access point falls below a threshold.

12. The method of claim 9, wherein the wireless hotspot mode facilitates a connection of the another user device to a network accessible to the user device.

13. The method of claim 12, wherein the network accessible to the user device comprises a cellular data network.

14. An apparatus, comprising:
one or more processors; and
a memory storing processor executable instructions that, when executed by the one or more processors, cause the apparatus to:
receive one or more network parameters of a wireless network associated with a network device, wherein the one or more network parameters of the wireless network comprise an identifier of the wireless network;
determine that a geographic distance to the network device satisfies a threshold;
enable, based on the geographic distance to the network device satisfying the threshold, a wireless hotspot mode, wherein the wireless hotspot mode implements, as one or more network parameters of the wireless hotspot mode, the one or more network parameters of the wireless network; and
establish, via the wireless hotspot mode, based on the identifier of the wireless network, a network connection with a user device previously connected to the network device.

15. The apparatus of claim 14, wherein the processor executable instructions that, when executed by the one or more processors, cause the apparatus to implement the one or more network parameters of the wireless hotspot mode, further cause the apparatus to:
implement, as one or more network credentials of the wireless hot spot mode, a network password for accessing the wireless network.

16. The apparatus of claim 14, wherein the processor executable instructions that, when executed by the one or more processors, cause the apparatus to receive the one or more network parameters further cause the apparatus to receive the one or more network parameters from a server.

17. The apparatus of claim 14, wherein the apparatus comprises a mobile device.

18. The apparatus of claim 14, wherein the processor executable instructions that, when executed by the one or more processors, cause the apparatus to implement the one or more network parameters of the wireless hotspot mode, further cause the apparatus to:

implement, as one or more network credentials of the wireless hot spot mode, one or more of a wireless encryption protocol, a security credential, a firewall configuration, a traffic routing configuration, or a network traffic configuration of the wireless network associated with the network device.

19. The apparatus of claim 14, wherein the processor executable instructions that, when executed by the one or more processors, cause the apparatus to determine that the geographic distance to the network device satisfies the threshold further comprise processor executable instructions that cause the apparatus to:
  determine a geographic location; and
  compare the geographic location to a geographic location associated with the network device.

20. The apparatus of claim 14, wherein the wireless hotspot mode is configured to facilitate a connection of the user device to a network accessible to the apparatus.

21. The apparatus of claim 20, wherein the network accessible to the apparatus comprises a cellular data network.

22. The apparatus of claim 14, wherein the processor executable instructions, when executed by the one or more processors, further cause the apparatus to modify, based on the geographic distance to the network device no longer satisfying the threshold, the one or more network parameters of the wireless hotspot mode to be different from the one or more network parameters of the wireless network.

* * * * *